3,382,712
WIND TUNNEL FREE FLIGHT
TEST APPARATUS
Truman M. Curry, Mercer Island, Wash., assignor to The
Boeing Company, Seattle, Wash., a corporation of
Delaware
Filed Dec. 21, 1964, Ser. No. 419,900
6 Claims. (Cl. 73—147)

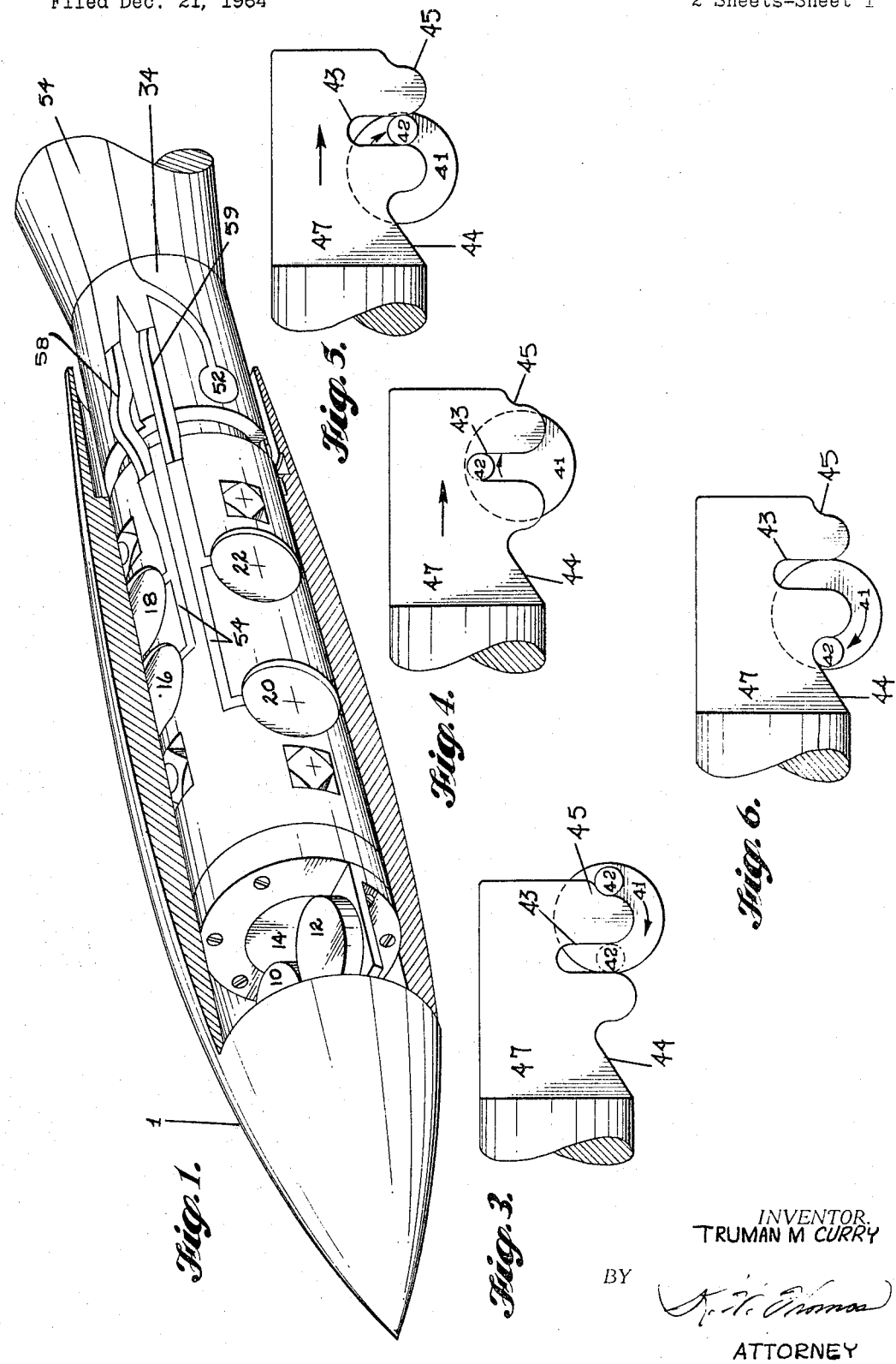

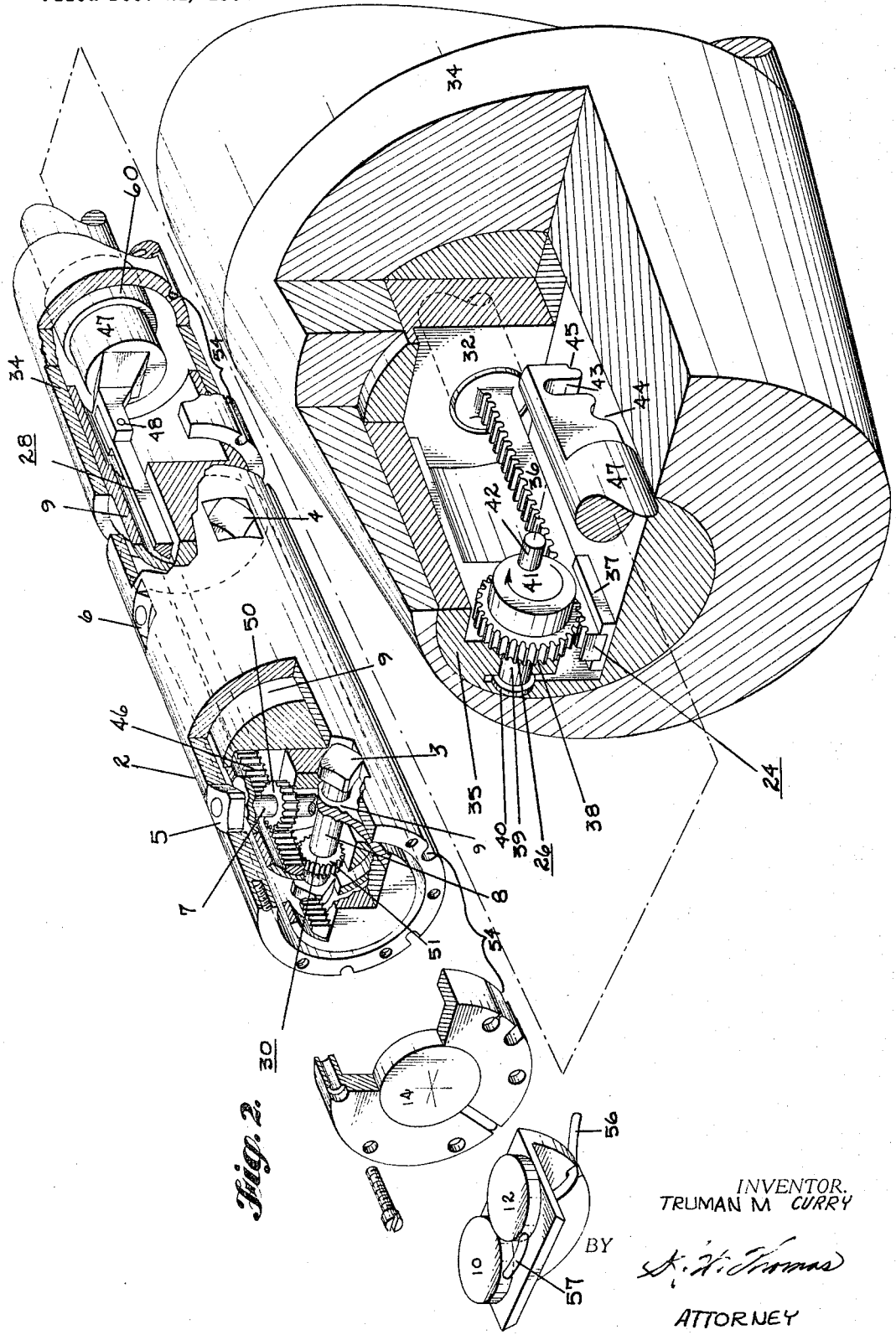

ABSTRACT OF THE DISCLOSURE

Apparatus for measuring static and dynamic forces experienced by a test body to be disposed in a moving fluid. Actuator means release a support to the test body for given periods of time during which force responsive means measure aerodynamic characteristics of the test body which, when released, is in free flight. The support includes a cylindrical member which is enclosed by, and affixed to, the test body. The cylindrical member is restrained and supported by square cams disposed in keeper holes in the sides of the cylindrical member. The cams are disposed to turn on shafts supported by a sting extension which is contained within the cylindrical member. As the square cams are rotated by the actuator means, their restraint upon the cylindrical member is released and the test body achieves free flight condition.

---

A feature of the present invention is the elimination of limiting dynamic response effects of force and moment carrying support structures inherent to conventional wind tunnel balances. In the past, the loads (forces and moments) applied to the wind tunnel model had to be restrained by a support structure which included in part a force transducer or balance which sensed the localized deflections or strains as a measure of the applied loads. Certain advantages in respect to adverse aerodynamic interference effects may be realized in this invention, as with balance type force measurements, by utilizing either a sting support or a strut type support depending on what the situation dictates.

It is an object of this invention to provide a static or dynamic force measuring system for measuring pitching, rolling and yawing moments and lift, drag, and side forces on an aerodynamic model with great precision.

It is a further object of this invention to provide a wind tunnel force and moment measuring device which measures yawing, pitching and rolling moments and drag forces separately and independently.

It is a further object of this invention to provide a wind tunnel force and moment measuring system which is unaffected by the dynamic response effects of the supporting structure or deflections of the supporting structure.

It is a still further object of this invention to provide means whereby error due to aerodynamic interference effects of supporting structure (sting) or deflections of said supporting structure are minimized during periods of actual force measurement.

A still further object of the instant invention is to provide for measurement of the static and dynamic forces involved in testing a three-dimensional model having six degrees of model freedom by providing free flight force measurement conditions.

Strain gage balances must be designed suitable for specific ranges of test loads because of the more or less constant bands of uncertainty which proportionately tend to obscure the data as measured force levels diminish under aerodynamic test conditions. In hyper-velocity (hot shot and shock tunnel) testing the allowable range of force testing is greater than that in facilities whose run times are several orders of magnitude longer. This is because the band of uncertainty due to temperature may be considered negligible, since the force transducer elements do not have time to heat up during the short test run. The main contributors to the band of uncertainty in strain gage balance apparatus is caused by amplitude and phase shift errors causing the gage output signal to be distorted, plus any mechanical hysteresis or discontinuities that may exist by virtue of imperfections in balance structure or the strain gages themselves.

Although it is true that a crystal accelerometer also has its band of uncertainty, the range of testing that may be performed with the accelerometer is considerably greater than strain gage balance devices. An accelerometer's range of testing is enhanced by its high voltage output producing good signal to noise ratios in the read-out circuits. Because the accelerometer output is based on a single point measurement, the use of the accelerometers in the instant invention greatly minimizes structural problems in producing continuity in data. Also, the high natural frequency of accelerometers produces negligible phase shift and amplitude distortions to the recorded pulse data. The range of inertia compensated balances in the hyper-velocity facilities is balance-limited rather than accelerometer-limited, thus requiring families of balances to cover the range of test requirements. One free flight pulsator being only accelerometer-limited can cover the entire range of force testing which might be encountered in the hyper-velocity facilities.

Briefly, the invention comprises apparatus for measuring static and dynamic forces comprising a sting, a test body having support means disposed in combination with said sting, force responsive means disposed in combination with the support means, and actuating means disposed to release the test body from its support means for measured periods of time. During these periods of measured time, the test body is completely free of restraining support thereby providing measurement of static and dynamic forces bearing on a test body within a moving fluid under simulated free flight conditions.

Other objects and various advantages of the disclosed free flight pulsator will be apparent from the following detailed description, together with the accompanying drawings, which are submitted for purposes of illustration only and not intended to define the scope of the invention, reference being had for that purpose to the subjoined claims.

In the drawings:
FIGURE 1 represents the free flight pulsator as it looks as a compact unit;
FIGURE 2 represents the free flight pulsator showing its working parts;
FIGURES 3, 4, 5 and 6 represent the free flight pulsator actuating mechanism in part.

Like components in the several figures of the drawings have been given the same reference characters. In FIGURES 1 and 2, the free flight pulsator is shown, less power unit and grounded support. In FIGURE 2, support means for a test body 1 (seen in FIGURE 1) includes: a structural member 2 having eight essentially square cams 3, 4, 5 and 6 disposed in essentially square cam keeper holes at various locations on member 2. The shafts of cams 3, 4, 5 and 6 are supported by Teflon bearings and member 9 to be discussed below. The eight essentially square cams include four yaw cams 5 and 6 (two shown and two, oppositely disposed on connecting shafts 7, are not shown) which are located in the pitch plane to rotate about vertical axes when actuated; and four pitch cams 3 and 4 (two shown and two, oppositely disposed on connecting shafts 8, are not shown) which are located in the yaw plane to rotate about horizontal axes. The test body 1 has a sliding fit to member 2 and is affixed thereto with a key and set screw arrangement (not shown). Briefly, the essentially square cams 3, 4, 5 and 6, which with member 2 support test body 1, are actuated to rotate concurrently within their respective cam keeper holes by actuating means to be described below. During the brief period in which the cams 3, 4, 5 and 6 are rotated through approximately 90 degrees, support member 2 acquires six degrees of freedom and test body 1 is essentially in free flight. Force sensing means accelerometers 10, 12, 14, 16, 18, 20 and 22, are attached to support member 2 and provide rapid response to forces upon test body 1.

The pitch cams 3 and 4 restrain axial force, rolling moment, and normal force in addition to pitching moment. The yaw cams 5 and 6 also restrain axial force and rolling moment as well as side force and yawing moment. The cams 3, 4, 5 and 6 are attached to the respective ends of four cam shafts 7 and 8 shown in FIGURE 2 (two are shown and two are not) which are supported by an inner cylindrical member 9 shown in FIGURE 2. Member 9 is an extension of member 34 described below. Member 9 is freely disposed within support 2.

In the instant invention, generally with reference to FIGURE 2, means disposed to rotate the essentially square cams 3, 4, 5 and 6 includes: a first reciprocating means 24 disposed to drive a first rotatable means 26; a second reciprocating means 28 disposed to be driven by the first rotatable means 26 and to drive a second rotatable means 30. The last-mentioned means 30 is cooperatively connected to rotate the essentially square cams 3, 4, 5 and 6.

Referring to FIGURE 2, the above generalized actuating means of the instant invention are particularized. The first reciprocating means 24 starting at the right side of FIGURE 2, as shown, comprises: actuator push rod 32, housed within sting body 34 and disposed to be actuated by a prime mover or power source (not shown) and connected to drive actuator reciprocating rack 36 which slides on a Teflon bushing 37 supported within member 35. The rack 36 engages an accelerating gear 38 at all times and as rack 36 is reciprocated by rod 32, rack 36 drives first rotatable means 26 which includes: the accelerating gear 38, disposed to rotate about a gear 38 supporting journal 39 within a bearing 40, and disposed in combination with an accelerating cam 41 having an accelerating drive pin 42 in fixed relationship to the cam 41. Pin 42 cooperates with the cam surfaces 43, 44, and 45 of the second reciprocating means 28. The second reciprocating means 28 comprises: a rack member 46 attached for ease of construction to a yoke on actuating rod 47 by a shackle pin 48. Reciprocating motion of rod 47 drives rack 46. As seen in FIGURE 2, the extreme right end of rod 47, as shown, is formed in part by the three cam surfaces, 43, 44 and 45, which are fully described below. It is by combination of surfaces 43, 44 and 45 with the first rotatable means 26 (in particular, pin 42) that the second reciprocating means 28 is actuated. The second reciprocating means 28 is connected to actuate the second rotatable actuating means 30 which comprises: a cam shaft accelerating gear 50 suitably secured to each of the cam shafts 7 in fixed relationship; and, a cam shaft accelerating gear 51 suitably secured to each of the cam shafts 8 in fixed relationship, the accelerating gear 51 and 50 being disposed to be actuated by the second reciprocating means 28, viz, in particular, rack 46.

A base pressure transducer 52 shown in FIGURE 1 is supported in the sting body 34 close to the transition to test body support means 2. The electrical connection cables for the accelerometer force sensing means 10, 12, 14, 16, 18, 20 and 22 and for the pressure transducer 52 are housed in covered cable access grooves 54, shown in FIGURE 2, in the sting 34 and in the support means 2.

The flexible accelerometer cables 56, 57, 58 and 59, shown in FIGURES 1 and 2, are directed along the access grooves 54 on the surface of test body support means 2 to appropriate meter connections (not shown) apart from the aerodynamic model 1.

In FIGURE 2, sting 34 is mated to member 35; member 35 houses actuating rod 47 which slides on Teflon bearings 60. Member 9, which is an extension of member 34, is freely disposed within support 2 and provides axial support for the actuating means 28 and 30 of the instant invention.

The manual activation cycle may be duplicated indefinitely, permitting possibly one cycle every fifteen milliseconds.

The full six degrees of freedom afforded to a test model by the instant invention assures that the force data is completely unaffected by ground-excited forces or by the response of the mechanical support system to both aerodynamic or ground-excited forces. The quality of the force data gathered is thus largely a function of the response of the sensing elements proper (namely accelerometers 10, 12, 14, 16, 18, 20 and 22) which offer adequately high response rates.

The instant invention provides means to support test model 1 until such time as it is desired to gather data; at that time the described means as shown in FIGURE 2 releases the test body 1, and engages it again when data has been gathered. During these two periods of engagement adjacent to a period of free flight time, starting and stopping shock loads, which may be excessively high, are restrained by cams 3, 4, 5 and 6. During the period of release it is important that the restraining mechanism (the aforementioned cams) breaks clear rapidly, completely and positively. Various configurations of cam actuated retracting pins, or pivoting internal clamps as well as double acting conical wedges have been considered but have been determined as less desirable to provide the positive release guaranteed by the cam action as provided by cams 3, 4, 5 and 6.

Thus, the cam design need not be square, although the instant invention shows as a preferred embodiment essentially square cams in square cam keepers. Other designs will give satisfactory results; for example, elliptical cams in elliptical keepers where the major diameter of the cam is the minor diameter of the keeper. The latter arrangement, however, requires 180 degree rotation and more cam stations than the embodiment shown and described.

In operation, the condition of free flight is achieved during the period of the simultaneous rapid rotation of supporting cams 3, 4, 5 and 6 through 90 degrees according to the teachings of this invention.

The above-described apparatus cooperates in the order as described to provide the particular operational rotation of the supporting cams of support 2, through 90 degrees. During a portion of this rotational cycle all of these cams 3, 4, 5 and 6 are completely disengaged from the surfaces of the square cam keeper holes in the support means 2. The only mechanical restraint to the test body 1 is now imparted by the flexible accelerometer cables 56, 57, 58 and 59 whose stiffness may be counted as negligible, considering the small distances through which test body 1 deflects during free flight and the free length of cable.

In operation, racks 46 and 36 together with push rod 32 are pulled to the right as shown in FIGURE 2, so that accelerating pin 42, as shown in FIGURE 2 and FIGURE 3, is at its initial position at cam surface 45. As actuator push rod 32 and push rack 36 are driven forward by the prime mover (not shown), that is, to the left as shown in FIGURE 2, the gear 38-cam 41-pin 42 assembly (the accelerating unit) are freely accelerated in a clock-wise direction (as shown) for a half revolution. During this time, pin 42 drives away from cam surface 45. During this half revolution, pin 42 experiences maximum rotational acceleration and engages sine cam surface 43, as shown in FIGURE 3 at the position where pin 42 is presented by dash lines. As actuator rod 32 and rack 36 continue to drive to the left, as shown in FIGURE 2, pin 42 continues its angular rotation, moving upwards in sine surface 43 to the top thereof as shown in FIGURE 4; rotation by pin 42 and travel within slot 43, as seen in FIGURE 3 and FIGURE 4, imparts a component of acceleration to rack 46 and actuating rod 47 (to the right as seen in FIGURE 2) until pin 42 reaches top dead center of sine surface 43, as shown in FIGURE 4, at which point maximum cam rack 46 velocity (to the right as shown in FIGURE 2) is attained. As pin 42 passes top dead center of sine surface 43, shown in FIGURE 5, the motion of actuating rod 47 to the right, as shown in FIGURE 2, is decelerated to zero velocity when accelerating pin 42 has completed one full revolution from its initial position seen in FIGURE 3, to its position as shown in FIGURE 5. At one full revolution of accelerating pin 42 which, of course, follows the rotating cam 41, accelerating pin 42 disengages the sine surface 43, soon after pin 42 passes its position as shown in FIGURE 5, and continues in its angular deceleration until pin 42 comes to rest at the stopping surface 44, as shown in FIGURE 6. At this point, actuating rod 47 has come to rest with its rear surface (the right end of actuating rod 47, as shown in FIGURE 2) butted up against the face of a magnet (not shown) which acts as a weak latch to prevent vibration and angular components of gravity from disturbing its position at rest at the end of the power cycle. It is during this acceleration and deceleration period of both the cam 41-pin 42 unit and the actuating rod 47-cam surface 43, 44 and 45 unit that rack 46 is caused by shackle pin 48 connection with rod 47 to move to the right in FIGURE 2 as shown, thereby causing, through the translating motion of rack 46, gears 51 and 50 to rotate cams 3, 4, 5 and 6 through a 90-degree arc within the cam keeper holes in member 2. During this time, all restraining moments and forces are removed from the support means 2 thereby imparting free-flight test conditions to test body 1.

The purpose of the initial free acceleration of the acceleration unit or first rotatable means comprising gear 38, cam 41 and pin 42, as pin 42 travels with cam 41 through the first one-half revolution of its total one and one-half revolutions from its position on surface 45 in FIGURE 3, is to provide a half revolution of time for accelerating the actuator push rod 32 and actuator piston (not shown), as well as the acceleration unit itself without introducing drag and inertia inherent in the system comprising actuator push rod 32, rack 46, cam shafts 7 and 8, and cams 3, 4, 5 and 6. The acceleration unit also has a half revolution to decelerate the actuator piston (not shown) and accelerating units, as pin 42 comes to rest on surface 44 in FIGURE 6 from its position in FIGURE 5. The accelerating pin 42 is engaged in the sine surface 43 for one-half a revolution of accelerating cam 41 of the total one and one-half revolutions provided during a single free-flight test. During this power cycle (during the time that corresponds to the one-half revolution of the accelerating cam 41 driving accelerating pin 42 within the sine surface 43) cams 3, 4, 5 and 6 may only be disengaged from the support means 2 cam keeper holes for approximately one-third to one-half the time corresponding to the time required for the power cycle depending on the detailed cam keeper design. This means that for a five millisecond free-flight period, anywhere from 35 to 50 milliseconds are allowed to complete the total actuator-powered cycle (i.e., the full one and one-half revolutions of the cam 41 pin 42 assembly), thus making timing and power requirements less stringent.

Since numerous changes may be made in the above apparatus and different embodiments may be made without departing from the spirit thereof, it is intended that all matter contained in the foregoing description, or shown in the accompanying drawings, shall be interpreted as illustrative and not in a limiting sense.

I claim:
1. Apparatus for measuring static and dynamic forces experienced by a test body to be disposed in a moving fluid comprising:
 (a) a sting;
 (b) support means fixedly attached to and supporting the test body in combination with said sting;
 (c) force responsive means disposed in combination with said support means; and,
 (d) actuating means associated with said sting and operably connected with said support means to release said support means and its affixed test body to thereby impart free flight conditions to the test body for a period of time.
2. The apparatus defined in claim 1 wherein said force responsive means include accelerometers.
3. The apparatus defined in claim 1 in which said actuating means includes:
 (a) reciprocating means disposed to be actuated in a pre-set fashion and to actuate;
 (b) rotatable means including means cooperating with said support means.
4. Apparatus for measuring static and dynamic forces experienced by a test body to be disposed in a moving fluid comprising:
 (a) a sting;
 (b) support means affixed to and supporting the test body and enclosed by the test body, said support means operably connected to said sting;
 (c) force responsive means cooperating with said support means;
 (d) actuating means associated with said sting and operably connected with said support means to release said support means and its affixed test body to thereby impart free flight conditions to the test body for a period of time, said actuating means including:
  (1) first reciprocating means;
  (2) first rotatable means disposed to be actuated by said first reciprocating means;
  (3) second reciprocating means disposed to be actuated by said first rotatable means, said second reciprocating means in turn disposed to drive;
  (4) second rotatable means.
5. Apparatus for measuring static and dynamic forces experienced by a test body to be disposed in a moving fluid comprising a sting, support means affixed to and supporting the test body, said support means being operably connected to said sting and operably associated with force responsive means, and said support means including a plurality of cams disposed within respective cam keepers and actuating means connected to effect a rotation of said cams, said actuating means being associated with said sting and operably connected with said support means to release said support means and its affixed test body to thereby impart free flight conditions to the test body for a period of time, said actuating means including:
 (a) an actuator push rod including a first push rack;
 (b) an accelerating gear including a drive pin, said accelerating gear being disposed to be actuated by said first push rack; and,
 (c) other actuating means including a second push rack and at least one cam surface for cooperation with said drive pin;
 (d) at least one cam shaft accelerating gear disposed to be actuated by said second push rack; and
 (e) a cam shaft interconnecting said plurality of cams with said cam shaft accelerating gear.
6. Apparatus for measuring static and dynamic forces experienced by a test body to be disposed in a moving fluid comprising:
 (a) a sting;
 (b) support means fixedly attached to and supporting the test body in combination with said sting;

(c) force responsive means disposed in combination with said support means; and
(d) actuating means associated with said sting and operably connected with said support means to release said support means and its affixed test body to thereby impart free-flight conditions to the test body for a period of time, said actuating means including:
   (1) reciprocating means disposed to be actuated in a pre-set fashion and to actuate;
   (2) rotatable means including means cooperating with said support means.

References Cited
UNITED STATES PATENTS 2,906,119   9/1959   Montgomery   73—147
3,034,348   5/1962   Holderer   73—147

DAVID SCHONBERG, *Primary Examiner.*